US005676993A

United States Patent [19]

Watterson et al.

[11] Patent Number: 5,676,993
[45] Date of Patent: Oct. 14, 1997

[54] PROCESS OF PRODUCING CACAO FLAVOR BY ROASTING COMBINATION OF AMINO ACIDS AND REDUCING SUGARS

[75] Inventors: Julia J. Watterson, Hummelstown; Kenneth B. Miller, Palmyra; Joseph J. Furjanic, Hummelstown; David A. Stuart, Hershey, all of Pa.

[73] Assignee: Hershey Foods Corporation, Hershey, Pa.

[21] Appl. No.: 476,703

[22] Filed: Jun. 7, 1995

[51] Int. Cl.$^6$ .................. A23L 1/22; A23L 2/56
[52] U.S. Cl. .................. 426/533; 426/534; 426/536; 426/537; 426/631; 426/650; 426/658
[58] Field of Search ................... 426/533, 534, 426/536, 537, 538, 650, 631, 615, 658, 660, 465, 466

[56] References Cited

U.S. PATENT DOCUMENTS

| | | |
|---|---|---|
| 4,547,377 | 10/1985 | Ogawa et al. . |
| 4,735,812 | 4/1988 | Bryson et al. . |
| 4,940,592 | 7/1990 | Byrne et al. . |
| 5,041,296 | 8/1991 | Byrne et al. . |

FOREIGN PATENT DOCUMENTS

239942A1  10/1987  Germany .

OTHER PUBLICATIONS

Mohr, W. et al. *Fette Seifen Anstrichmuttel*, No. 8, pp. 515–521 (1971).

Darsley, R.R. and V.C. Quesnel, *J. Sci. Fd Agric.* 23:215–225 (1972).

T.A. Rohan, *DECHEMA* (Deut. Ges. Chem. Apparatew.), vol. 70, pp. 301–21 (1972).

Code of Federal Regulations, No. 21, Part 14, Cacao Products (Apr. 1, 1974).

Foster, Herbert, *The Manufacturing Confectioner*, pp. 51–59 (May, 1978).

Lane, M.J. and H.E. Nursten, *ACS Symposium Series* vol. 215, pp. 141–157 (1983).

Ney, K.H. *gordian* 85(5): 88–92 (1985).

Zoumas, B.L. and E.J. Finnegan, "Chocolate and Cocoa", *Kirk–Othmer Encyclopedia of Chemical Technology*, vol. 6 (3rd. Ed., Wiley–Interscience, New York) pp. 1–19 (1985).

Arnoldi, A. et al., *J. Agric. Food Chem.* 36: 988–992 (1988).

Rizzi, George, P., *Thermal Generation of Aromas*, Chapter 16, pp. 172–181 (Sep. 1989).

Federal Register, vol. 56, No. 153 (Aug. 8, 1991).

Smith, Robert E., et al. *J. Agric. Food Chem.* 42: 432–434 (1994).

*Primary Examiner*—Leslie Wong
*Attorney, Agent, or Firm*—Scully, Scott, Murphy & Presser

[57] ABSTRACT

The present invention is directed to a means of enhancing the cocoa flavor to a fat matrix by adding thereto about 0.3 g to about 4.0 g phenylalanine, 0.75 g to about 2.0 g leucine, and about 0.5 g to about 3.0 g reducing sugar and optionally about 0.05 g to about 0.8 g alanine for each 100 g of unroasted fat matrix and roasting the same, and to the products produced therefrom.

56 Claims, No Drawings

PROCESS OF PRODUCING CACAO FLAVOR BY ROASTING COMBINATION OF AMINO ACIDS AND REDUCING SUGARS

BACKGROUND OF THE INVENTION

1. Field of the Invention

This invention is directed to a process for enhancing the cacao flavor or more generally the organoleptic properties of various food products including the confectionery products made from inferior or lower quality cocoa beans. This is accomplished by roasting a combination of free amino acids and reducing sugars in a fat matrix, e.g., cocoa liquor base containing cocoa liquor derived from the inferior beans or by nib roasting the inferior cocoa beans. The product so obtained may be used in cocoa and chocolate products as well as for flavoring in other food products.

2. Description of the Prior Art

In the processing of foodstuffs for human consumption, a critical component to any product is its flavor. Flavor comprises three principal characters, namely tactual, gustatory and olfactory, or feel, taste and smell. The tactual component concerns the feel or texture of the food in the mouth (e.g. smooth, chewy, fluid, etc.) while the gustatory component concerns astringency and the sensations which are detected on the tongue (e.g. salt, sweet, sour, bitter, etc.). The olfactory component involves the smell of the foodstuff and comprises the odor of the foodstuff, which is perceived on smelling the food, and the aroma of the foodstuff, which is sensed by the olfactory receptors while the food is being chewed.

Basically, each of the five basic senses of sight, touch, smell, hearing and taste are involved in flavor appreciation. Consequently, to only consider the odor produced when foods are processed would be a foolish restriction to only part of the flavor pattern. It is well known that foodstuffs, such as beef, develop desirable flavor characteristics upon cooking and that these characteristics are due to the presence of a compound or compounds which undergo a chemical reaction during processing. These compound or compounds have become known as "flavor precursors" and many attempts have been made to isolate them from unprocessed foodstuffs and to identify the important compounds in hopes of duplicating a particular flavor. Among the foods whose precursors have been studied are chocolate.

Extensive studies of the fermentation of cocoa beans have shown that the enzymatic hydrolysis of cocoa proteins leads to the release of free amino acids and short peptides. It has been generally assumed that these short peptides and/or free amino acids react with reducing sugars during cocoa bean or liquor roasting to form, through Malliard-type reactions, cacao flavor and aroma compounds.

For example, R. R. Darsley, et al., *J. Sci. Fd Agric.* 23: 215–225 (1972) discussed the mechanism involved in roasting cocoa beans and the production of aldehydes from the amino acids in the roasted cocoa. A. Arnoldi, et al., *J. Agric. Food Chem.* 36: 988–992 (1988) studied the Malliard reaction in cocoa beans through the use of a model system in cocoa butter and particularly looked at the formation of pyrazines obtained from reacting eight different amino acids known to be present in cocoa beans with fructose, one of the most abundant sugars in cocoa beans.

Several processes for producing cacao-like aroma and/or flavor based on a thermal reaction between amino acids or peptides and sugars have been described. German patent (DD) no. 239,942 to the Academy of Sciences of the GDR described a process for the production of cocoa aromatic compounds by thermally reacting a partial protein hydrolysate such as gelatin with a sugar while maintaining the water content within very narrow parameters.

Chocolate-like aromas have also been produced by heating together valine, leucine, glucose and epicatechine as shown by T. A. Rohan and T. F. Stewart, *The British Manufacturing Industries Research Association Research Reports*, No. 145, pp. 1–35 (1969). Similarly, the production of chocolate-like aromas was disclosed by Herbert Foster in *The Manufacturing Confectioner*, pp. 51–59 (May, 1978) by heating together threonine or valine with glucose and by M. J. Lane and by H. E. Nursten in *ACS Symposium Series* V215, pp. 141–157 (1983) by heating together serine or tyrosine with glucose.

It has been reported that fructose played a greater role than glucose, as did valine, leucine and phenylalanine with regard to other amino acids, in the development of cocoa aroma. However, although a roasted synthetic mixture of these precursors was found to have a chocolate odor, it did not possess the subtlety and complexity of a cocoa aroma.

Although the above-noted references were successful in the production of chocolate-like aroma, none of the systems produced or enhanced cacao flavor. K. H. Ney, *Gordian* 85(5): 88–92 (1985) disclosed the production of cocoa flavor by the heating of mixtures of fructose, and equal concentrations of leucine, valine and phenylalanine. However, the cocoa flavor produced was weak. The authors did not recognize that valine was not essential to produce cocoa flavor and that an enhanced flavor could be produced if the amount of phenylalanine present is increased.

In a somewhat similar fashion, U.S. Pat. No. 4,940,592 and 5,041,296 to Byrne et al. describe a process for the formation of chocolate flavor by microwave cooking leucine, phenylalanine and sugar in a solvent such as propylene glycol or glycerine, or mixtures thereof and water. However, they do not add the leucine, phenylalanine and sugar directly to a fat matrix. For example, Byrne, et al. did not add the leucine, phenylalanine, and sugar mixture directly to unroasted chocolate liquor or to cocoa nibs, especially cocoa nibs of inferior quality. They specifically teach that the reaction between the sugars and the amino acids cannot take place in aprotic solvents, such as vegetable oil, thereby teaching away from a procedure for increasing cocoa flavor in a fat matrix, such as chocolate. Furthermore, when applicants roasted this combination in the amounts indicated in Byrne, et al. in a chocolate compatible, high lipid matrix such as cocoa liquor, the aroma and flavor generated did not resemble cacao to a high degree.

Consequently, it is desirous to obtain a system which, when roasted in the presence of reducing sugars in a lipid-based, chocolate compatible system, including vegetable-oil based fat matrices, (such as chocolate liquors, cocoa butter, cocoa butter equivalents or cocoa butter substitutes, and the like) will yield and/or enhance cacao flavor and aroma.

Sensory analyses by trained chocolate liquor panelists have shown that cacao flavor is one of the most important flavor attributes affecting the flavor quality of cocoa beans. The cacao intensity of most chocolate liquors ranges from 4–7 on a 0–15 numeric scale. Cacao flavor is largely determined by the cocoa bean fermentation process. Improper fermentation (either too little or too much) can yield poor cacao flavor.

The presence of off-flavors also plays a major role in determining the overall flavor quality because they detract and/or mask the desirable cacao flavor. Some of the more common off-flavors include: sour, putrefaction, smoky, and musty. Most of these undesirable flavor notes are a result of improper processing of cocoa beans either during the fermentation, drying or storage steps. For example: 1) overfermented beans can develop sour, putrefied notes, 2) smoky flavors occur when beans are dried over an open flame, and 3) musty flavors are produced when beans are stored under high moisture conditions.

There are different grades of cocoa beans which produce different flavor grades of chocolate liquor. At the high quality extreme, there are cocoa beans producing chocolate liquor with high cocoa flavor (6–7 range) and minimal off-flavors. At the low extreme, there are cocoa beans producing chocolate liquor having higher off-flavors and minimal cacao flavor (4–5 range). There are also cocoa beans of intermediate quality which can have either moderate cacao flavor (5–6 range) and off-flavors or low cacao flavor (4–5 range) and off-flavors.

The best chocolates are produced from the highest flavor quality cocoa beans. However, the highest quality cocoa beans can also be the most expensive, while the poorest quality cocoa beans are less expensive. In order to reduce the costs of manufacturing chocolate, it would be desirable to enhance cacao flavor in order to utilize more of the less expensive beans without sacrificing flavor quality. This is one of the main objectives of the present invention.

The present inventors have found such a system that has considerably enhanced the cacao flavor of chocolate liquor produced from cocoa beans of lower flavor quality.

SUMMARY OF THE INVENTION

The present invention is directed to a means of enhancing cocoa flavor in fat matrices normally utilized in making chocolates such as unroasted cocoa nibs or unroasted chocolate liquor, cocoa butter equivalents or cocoa butter substitutes by adding sufficient amounts of phenylalanine and leucine and a reducing sugar (hereinafter "amino acid/sugar mixture") to an unroasted fat matrix so that when roasted, the sugar and amino acid react to produce an enhanced cocoa flavored product, and roasting the fat matrix containing the amino acid/sugar mixture. In an embodiment of the present invention, the present invention is directed to a means of enhancing cocoa flavor in chocolate produced from cocoa beans of lower quality by adding sufficient amounts of phenylalanine and leucine and a reducing sugar (hereinafter "amino acid/sugar mixture") to unroasted chocolate liquor or unroasted cocoa nibs from inferior cocoa beans so that when roasted, the sugar and amino acid react to produce an enhanced cocoa flavored product, and roasting the amino acid/sugar containing chocolate liquor or cocoa nibs. For example, the present invention encompasses a process for enhancing the cocoa flavor by adding to every 100 g of said unroasted fat matrix about 0.3 g to about 4.0 g phenylalanine, about 0.3 g to about 2.0 g leucine, wherein the ratio of phenylalanine to leucine is at least 1.25 (w/w) and about 0.5 g to about 3.0 g reducing sugar and (b) roasting the product of (a). The present invention is also directed to mixing about 0.3 g to about 4.0 g phenylalanine, about 0.3 g to about 2.0 g leucine, such that the ratio of phenylalanine to leucine is at least 1.25 w.w, and about 0.5 g to about 3.0 g reducing sugar with that amount of cocoa nibs obtained from inferior cocoa beans that would generate each 100 g of unroasted chocolate liquor in sufficient amount of solvent, preferably water, for the amino acid/sugar mixture to be fully absorbed by the cocoa nibs, and roasting the same. The present invention also encompasses these roasted products. It is also directed to a flavor precursor composition comprising about 0.3 g to about 4.0 g phenylalanine, about 0.3 g to about 2.0 g leucine, such that the weight ratio of phenylalanine to leucine is at least 1.25 and about 0.5 g to about 3.0 g reducing sugar per each 100 g of unroasted fat matrix, especially chocolate liquor obtained from inferior cocoa beans. It is also directed to the modified cocoa nibs, i.e, the cocoa nibs that have absorbed the amino acid/sugar mixture defined hereinabove and to the chocolate liquor obtained from the modified cocoa nibs. Finally, the present invention is directed to the process of making confectionery products using the roasted fat matrix prepared in accordance with the present invention and the chocolate confectionery product produced therefrom.

However, another embodiment of the present invention is the addition of alanine to the amino acid/sugar mixture. The presence of alanine provides a mediative influence on taste parameters such that the composition may employ a much broader range of the ratio of phenylalanine to leucine, while achieving the benefits of the invention. Thus, if alanine is present, there is no restriction upon the ratio of phenylalanine to leucine. The present invention is also directed to the process of enhancing cocoa flavor in fat matrixes, including cocoa liquor and cocoa nibs obtained from inferior quality cocoa beans, and to the flavor precursors, and the chocolate products produced therefrom.

DETAILED DESCRIPTION OF THE INVENTION

As used herein, the term "fat matrix", when used in either the singular or plural form, refers to a vegetable oil that is used in making confectionery products. Examples include cocoa butter, chocolate liquor derived from cocoa beans, cocoa butter substitutes, cocoa butter equivalents, and the like. As used herein, the fat matrix also refers to cocoa nibs. It is to be understood to one skilled in the art that fat matrices exclude those oils which are not used in making confectionery products, such as cooking oils, salad oils, and the like. It also excludes glycerine and propylene glycol or mixtures thereof or mixtures of glycerine or propylene glycol with ethanol.

Unless specified to the contrary, the weights produced in the specification are per 100 g of fat matrix. If the fat matrix are cocoa nibs, then the "weight" refers to that amount of cocoa nibs that would generate 100 grams of unroasted chocolate liquor.

Cocoa butter substitutes and equivalents are terms of art well known to the skilled artisan. Cocoa butter equivalents are chemically similar to cocoa butter and can replace cocoa butter in any proportion without any harmful effects. Cocoa butter substitutes do not chemically resemble cocoa butter, but are compatible with cocoa butter within specific limits.

Both cocoa butter substitutes and equivalents are manufactured from different sources of fats and by different processes. Cocoa butter substitutes are produced from lauric acid fats such as coconut, palm and palm kernel oils by fractionation and hydrogenation, and from domestic fats such as soy, corn, and cotton seed oil by selective hydrogenation or from palm kernel stearines by fractionation. On the other hand, cocoa butter equivalents are produced from, inter alia, palm kernel oil and other specialty fats such as shea and illipe by fractional crystallization or from edible beef tallow by acetone crystallization.

Examples of cocoa butter equivalents include COBERINE® (vegetable oil from palm and shea), CHOCLIN™ (vegetable oil from palm and shea) and the like. Examples of cocoa butter substitutes include CAPRENIN® which is the common name for caprocaprylobehenin, SALATRIM®, which is a family of triacylglycerols having the physical properties of fat but with approximately half the calories, produced by the interesterification of highly hydrogenated vegetable oils with triacylglycerols of acetic, propionic and/or butyric acids.

An aspect of the present invention is to improve the cocoa flavor of a fat matrix by adding thereto the amino acid/sugar mixture of the present invention, as defined hereinabove. When the amino acid/sugar mixture is added to the fat matrix before roasting, it is referred to as "the preflavor composition".

Another aspect of the present invention is in improving the cacao flavor and organoleptic properties of inferior or lower quality cocoa beans. By "inferior or lower quality cocoa beans," it is meant cocoa beans which do not have a high cocoa flavor, e.g., from cocoa beans giving rise to a low rating by a panel of experts who specialize in taste testing chocolates. Obviously, the amino acid/sugar mixture of the present invention would have the greatest effect on the cocoa beans or the chocolate liquor having the poorest ratings, i.e., 4–5 cacao rating, by impregnating the cocoa nibs or liquor from these cocoa beans with the amino acid/sugar mixture of the present invention. The cacao flavor of the cocoa bean or liquor is greatly enhanced after roasting. In addition, the amino acid/sugar mixture of the present invention is effective in enhancing the cacao flavor of the cocoa bean of intermediate quality or the chocolate liquor produced therefrom having an intermediate rating (e.g., 5–6). Although the amino acid/sugar mixture of the present invention also enhances the cacao flavor of cocoa beans or chocolate liquor of the highest quality, in most cases, it is not practical or necessary to impregnate these cocoa nibs or their liquor since they have a high cocoa flavor in the first instance. Unless specified to the contrary, as used herein, "inferior cocoa beans" will refer to cocoa beans producing a liquor or the liquor itself having a cacao rating of below 6.

"Chocolate liquor", as used herein, is a term of art well known in the chocolate industry. It is the solid or semiplastic food prepared by finely grinding the kernel or nib of the cocoa bean. Normally, chocolate liquor is prepared by undergoing various processes; i.e., cleaning, winnowing, roasting and grinding. Each of these steps are generally discussed hereinbelow.

The first step in the process of making chocolate liquor is cleaning the cocoa bean and removing foreign objects therefrom. The foreign objects may be stones, metals, twigs, twine or other matter which are mixed in with the cocoa bean or matter that adheres to the cocoa bean, such as sand and dirt.

The cocoa beans next normally undergo a roasting step. This is the step where chocolate flavor is normally developed. It is essentially a cooking step which promotes reactions of the latent flavor precursors, such as the proteins, amino acids, reducing sugars, tannins, organic acids and other unidentified compounds in the cocoa bean to form products which are highly flavored.

Roasting conditions are adjusted to produce different types of flavor. For example, low, medium, full and high roasts are produced by varying temperature, humidity and amount of time in the roaster. For instance, a high roast produces strong flavors and dark color, while a low roast produces mild flavors and light color. Roasting temperatures vary from 70° C. to 180° C. while roasting time tends to vary from about 30 to 60 minutes.

Winnowing, the next step in the process, is the process of separating the nib or kernel from the inedible shell. This is an important operation since the failure to adequately remove the nib from the shell produces chocolate products which are lower in quality.

The final step is the grinding of the kernel or nib of the cocoa bean. The nib is a cellular mass which contains 50–56% cocoa fat. The grinding steps liberate the fat locked within the cell wall.

These processes described hereinabove are performed under conventional conditions known to one skilled in the art and produce chocolate liquor.

The term, "unroasted chocolate liquor", is the cocoa mass that is formed in accordance with the procedure described hereinabove when the roasting step is omitted. In other words, the cocoa bean is cleaned, winnowed and ground in accordance with conventional techniques, but does not undergo the roasting step.

The unroasted chocolate liquor described herein may be pretreated prior to being roasted. The pretreatment may consist of extracting the winnowed cocoa nibs with water or other solvent. In this process, caffeine and cocoa flavor precursors may be removed. The decaffeinated cocoa beans are then ground in accordance with conventional techniques to produce a decaffeinated chocolate liquor with inferior cacao flavor.

Unless specified to the contrary, the term, "unroasted chocolate liquor" encompasses the unroasted chocolate liquor that has not undergone pretreatment, as described hereinabove. If reference is made to the "pretreated chocolate liquor" the term "pretreated or extracted chocolate liquor" will be utilized.

As described hereinabove, an embodiment of the present invention is directed to impregnating a chocolate liquor from an inferior cocoa bean or the cocoa nib from an inferior cocoa bean with phenylalanine and leucine and a reducing sugar (referred to herein as the "amino acid/sugar mixture") and roasting the impregnated liquor or cocoa nibs to produce a cocoa flavored liquor. Embodiments of the present invention include the preflavor composition containing unroasted chocolate liquor, phenylalanine, leucine and optionally alanine and a reducing sugar, and the product derived from roasting.

By the term "reducing sugar", it is meant a sugar having a free aldehyde or keto group, capable of reducing indicators, such as the cupric ion ($Cu^{2+}$) complexes to the cuprous form ($Cu^+$). Examples of reducing sugars that can be utilized in the preflavor composition of the present invention include erythrose, ribose, arabinose, allose, altrose, glucose, mannose, threose, xylose, lyxose, gulose, idose, galactose, talose, erythrulose, ribulose, xylulose, psicose, fructose, sorbose, tagatose, and the like. The preferred reducing sugars are monosaccharides, especially aldoses or ketoses having 5 or 6 carbon atoms. It is even more preferred that the reducing sugar is fructose, arabinose and especially glucose. The most preferred sugars are fructose and especially glucose. In fact, the present inventors have found that fructose produces a more intense taste, although it may also simultaneously increase the off-tastes.

The preflavor composition of the present invention must contain at least one reducing sugar; however, it may also contain more than one reducing sugar. For example, it may contain both glucose and arabinose. It is preferred that the precursor composition contain no more than four reducing sugars, and more preferably no more than three reducing sugars and most preferably no more than one or two different reducing sugars.

The reducing sugars may be present in various stereoisomeric forms, i.e., D, L or mixtures of D or L, including racemic mixtures. All of these forms and combinations thereof are contemplated by the present invention. However, it is preferred that the reducing sugar be in the D form or the racemic form, and more preferably, in the D form. If more than one reducing sugar is present, it is preferred that at least one of the reducing sugars is in the D or racemic form, and it is most preferred that all of the reducing sugars present are in the racemic or D form. Examples include, D-glucose, D-fructose, D arabinose, D, L arabinose, and the like.

The reducing sugar is present in the preflavor composition in amounts effective to react with the amino acids in the preflavor composition of the present invention to produce cocoa flavor.

Unless specified to the contrary, all of the weights given hereinbelow are per 100 g of the fat matrix.

It is preferred that the reducing sugar be present in amounts ranging from about 0.5 g to about 3.0 g, more preferably from about 0.75 g to about 2.0 g, and most preferably from about 0.75 g to about 1.5 g.

It is preferred that the ratio of total amino acid to reducing sugar added to the unroasted chocolate liquor ranges from about 0.2 to 3.00 (w/w) and more preferably from 1.00 to 2.75, and even more preferably, from 1.5 to 2.50 and especially more preferably from 1.75 to about 2.25 (w/w) and most preferably, the ratio is about 2:1 (w/w).

If more than 1 sugar is present, it is preferred that at least one of the sugars is glucose, fructose or arabinose, and even more preferred that the reducing sugar is a mixture of any two of glucose, fructose and arabinose and most preferably, a mixture of all three sugars, wherein the total amount of sugar present is within the ranges given above. When more than one sugar is present, it is preferred that the various sugars be present in about equal amounts (w/w) except for fructose. When fructose is present, it is preferred that there be 2–3 times more fructose present than the other sugars (w/w).

The other component in the preflavor precursor composition of the present invention is the amino acid component.

The amino acids that must be present in the preflavor composition of the present invention are leucine and phenylalanine. These amino acids should be present in effective amounts to react with the reducing sugars during the roasting step to produce cocoa flavor. The amount of phenylalanine present in the preflavor composition preferably ranges from about 0.3 g to about 4 g, more preferably from about 0.75 g to about 2.5 g and most preferably from about 1.00 g to about 2.0 g. Leucine is preferably present in amounts ranging from about 0.3 g to about 2 g and more preferably from about 0.3 g to about 1.5 g and most preferably from about 0.5 g to about 1.25 g. When the amino acids in the amino acid/sugar mixture in the preflavor composition do not contain any alanine, then the ratio of phenylalanine to leucine (w/w) is at least 1.25, and more preferably 1.50 and most preferably at least 1.5–6.0. However, if alanine is added, the ratio of phenylalanine to leucine ratio by weight is not critical. Thus, when alanine is present, the ratio may be below 1.25, although even in this embodiment it is preferred that the ratios are as indicated hereinabove. Alanine, when added to the preflavor composition is preferably present in amounts ranging from about 0.05 g to about 0.80 g and even more preferably from about 0.08 g to about 0.70 g and most preferably from about 0.1 g to about 0.5 g.

In the preferred embodiment, the amount of phenylalanine present is correlated with the amounts of alanine present, i.e., the amount of alanine present is at a lower or equal relative level of its range relative to that of phenylalanine. For example, when the amount of phenylalanine present is high, the amount of alanine present is either at low, moderate, or high levels of its range. However, when the phenylalanine is present at low levels, then alanine is also present in the lowest amounts.

In this case, high levels of phenylalanine are greater than about 2.0 g of phenylalanine per 100 g of fat matrix, while low levels are less than 0.75 g/100 g of fat matrix. Low levels of alanine are 0.25 or less alanine per 100 g of fat matrix, moderate levels are 0.25–0.50 g of alanine per 100 g of fat matrix, and high levels of alanine are at greater than 0.50 g per 100 g of fat matrix.

In addition, in preferred embodiments, the amount of phenylalanine present exceeds the individual amounts of alanine when present, and leucine (w/w). In even more preferred embodiments, the amount of phenylalanine present exceeds the sum of the amount of leucine and alanine, when present.

It is also preferred that the amount of phenylalanine present is about the same as or is greater than the amount of sugar present. In an even more preferred embodiment, the amount of phenylalanine present ranges from about 1.0 to about 2 times the amount of sugar present and more preferably from about 1.0 to about 1.5 times the amount of sugar present (w/w).

In addition, in preferred embodiments, the amount of leucine exceeds the amount of alanine, when present. In an even more preferred embodiment the amount of phenylalanine exceeds the sum of the amounts of alanine and leucine present (w/w) and the amount of leucine exceeds the amount of alanine present (w/w). In a preferred embodiment the amount of leucine present is about 2.5 to 6 times greater than the amount of alanine used (w/w). In another preferred embodiment it is preferred that the amount of phenylalanine utilized is about 5–7.5 times greater than the amount of leucine utilized (w/w).

Besides the aforementioned amino acids, other amino acids may additionally be present. These other amino acids include the twenty naturally occurring amino acids. It is preferred that these additional amino acids have a basic side chain, such as in histidine, lysine, or arginine, an aromatic side chain, such as in tyrosine, or aliphatic side chain, such as valine or isoleucine. In an even more preferred embodiment, the additional amino acids are added to the composition containing alanine, phenylalanine, leucine and a reducing sugar as described here.

In an embodiment, the preflavor composition of the present invention contains at least one additional amino acid; it may contain as many as 8 additional amino acids, although it is preferred that no more than four additional amino acids are present. In fact, as few as one additional amino acid may be present in the preflavor composition of the present invention. The preferred additional amino acids include tyrosine, arginine, valine, isoleucine, and lysine. Of these, the most preferred amino acid is tyrosine.

If additional amino acids are present, it is preferred that the total amount of these additional amino acids range from 0.5–2.0 g per 100 g and more preferably from 0.8 to 1.5 g per 100 g of fat matrix.

When present, it is preferred that the amount of tyrosine ranges from about 0.03 to about 1.5 g per 100 gm of fat matrix and more preferably from about 0.06 to 1.0 g. The preferred amount of arginine, when present ranges from about 0.03 to about 0.4 g per 100 g of fat matrix and more preferably from about 0.05 to about 0.3 g; while the preferred amount of valine, when present, ranges from about 0.1 to about 0.7 g per 100 g of fat matrix, and more preferably, from about 0.2 to about 0.5 g. When present, it is preferred that the amount of lysine ranges from about 0.1 to about 0.75 g per 100 g of fat matrix and more preferably from about 0.2 to about 0.5 g and that isoleucine, when present, ranges from about 0.02 to about 0.3 g per 100 g of fat matrix and more preferably from about 0.04 g to about 0.09 g per 100 g of fat matrix.

The various amino acids mixed in the preflavor composition may exist in various stereoisomeric forms, D L or mixtures thereof, including racemic mixtures. It is preferred that the amino acids be in the racemic form and more preferably in the L form.

The preflavor composition of the present invention encompasses all of the combinations and permutations of the various components listed hereinabove, including the percentages indicated herein.

The amount of fat matrix used is dependent upon the amount of chocolate that is being produced as well as the type of chocolate being produced. This amount is easily calculable by one skilled in the art.

When the amino acid/sugar mixture is added to unroasted fat matrix such as chocolate liquor, it is thoroughly mixed. After these components are thoroughly mixed, the mixture is then roasted, i.e., cooked. The roasting step is in accordance with conventional methods used to roast cocoa nibs and/or liquor. The reaction mixture is roasted at conventional temperature to effectuate and complete the flavoring reactions, such as the Malliard reactions, Amidori rearrangement, the Strecker degradation, and other chemical reactions between the sugar and the amino groups of the amino acids and proteins to form a flavor compound, such as pyrazines. In addition, other chemical reactions occur during the roasting step, such as the removal of unpleasant volatile acids and astringent compounds, partial breakdown of the sugars, modifications of the tannins, reactions promoting color changes of the liquor, and formation of other nonvolatile compounds with the concomitant reduction in bitterness, and the like.

The amino acid/sugar mixture is either liquor roasted or flake roasted with the fat matrix using conventional techniques. Liquor roasting involves heating the fat matrix, e.g., chocolate liquor, plus precursors in an enclosed vessel while stirring the mixture. Flake roasting involves first refining the unroasted fat matrix and the flavor precursors under cold conditions to form thin sheets of liquor called flakes. These flakes are then spread onto a baking screen, and the flavor is developed in an oven. Alternatively, if the fat matrix is cocoa nibs, the cocoa nibs are infused with the amino acid/sugar mixture, and then undergo the process of nib infusion roasting. In this method, the raw cocoa nibs are not ground into a liquor and refined before roasting. Instead, to incorporate the amino acid/sugar mixture into the nib, the amino acids and sugars are added into sufficient amounts of aqueous solvent, preferably water, until dissolved. The nibs are immersed in this aqueous infusion solvent, e.g., soaked, in the amino acid sugar solution at slightly elevated temperatures, such as about 50° C., for sufficient time until they absorb the water. Usually this takes approximately one hour. After the soaking step, the nibs typically have a moisture content of about 25–40% and preferably about 30% (w/w). Optionally, the nibs are oven dried at sufficient temperature and for sufficient time to substantially lower the moisture content, preferably to less then about 10%, and even more preferably to about 5% (w/w). Again, the temperature of the oven is at slightly elevated temperatures, such as about 50° C., and this drying step usually takes at least an hour. The nibs are then roasted in a nib roaster at sufficient temperature and for sufficient time to develop flavor. For example, in a preferred embodiment, the nibs are roasted for one to eight minutes at an air temperature of approximately 165° C. The nibs are then cooled. Optionally, they are then ground refined to make chocolate liquor.

Thus, the unroasted chocolate fat matrix, such as chocolate liquor or unroasted cocoa nibs, contains or absorbs, respectively, effective amounts of sugar molecules and amino acids in order to promote, enhance and/or effectuate the reactions described hereinabove, especially the flavoring reactions, thereby producing a roasted matrix having enhanced cocoa flavor.

It has been observed by the present inventors that the addition of the amino acid/sugar mixture to the chocolate liquors or cocoa nibs from inferior cocoa beans has enhanced significantly the cocoa flavor thereof. For example, it has been found that adding these precursors to low to moderate flavor liquors increased the cocoa flavor score from expert panelists from about 5.3 to 6.0 and from 5.4 to 6.2. Therefore, adding the amino acid/sugar mixture to inferior chocolate liquors has increased the cacao flavor score from the low to moderate flavor range and from the moderate to high cacao flavor range.

The roasted fat matrix, especially the roasted chocolate liquor composition formed by the present invention, is useful for making chocolate confections and is used in place of the chocolate liquors normally utilized in making the various types of chocolates.

The most popular chocolate or chocolate candy consumed in the United States is in the form of sweet chocolate or milk chocolate. Milk chocolate is a confection which contains nonfat milk solids, milk fat, chocolate liquor, a nutritive carbohydrate sweetener, cocoa butter and may include other optional ingredients such as emulsifiers and flavorings and other additives. Sweet chocolate differs from milk chocolate in that it requires more chocolate liquor and limits the amount of milk solids. Semisweet chocolate requires at least 35% by weight chocolate liquor and is otherwise similar in definition to sweet chocolate. Commonly known dark chocolate, generally containing only chocolate liquor, a nutritive carbohydrate sweetener and cocoa butter, is by definition either a sweet chocolate or a semisweet chocolate. Buttermilk chocolate and skim milk chocolate differ from milk chocolate in that the milk fat comes from various forms of sweet cream buttermilk and skim milk, respectively, and in the case of skim milk, the total amount of milk fat is limited to less than the minimum for milk chocolate. Mixed dairy product chocolates differ from milk chocolate in that the milk solid includes any or all of the milk solids listed for milk chocolate, buttermilk chocolate or skim milk chocolate. White chocolate differs from milk chocolate in that it contains no non-fat cocoa solids. As used herein, the term "chocolate" denotes chocolate, baking chocolate, milk chocolate, sweet chocolate, semisweet chocolate, buttermilk chocolate, skim milk chocolate, mixed dairy product chocolate, white chocolate and nonstandardized chocolates, unless specifically identified otherwise.

Chocolate used in foods in the United States is subject to a standard of identity established by the U.S. Food and Drug Administration (FDA) under the Federal Food, Drug and Cosmetic Act. The U.S. definitions and standards for the various types of chocolate are well established and are found in the Code of Federal Regulations, No. 21, Part 14, Cacao Products, Apr. 1, 1974, the contents of which are incorporated herein by reference. Nonstandardized chocolates are those chocolates which have compositions which fall outside the specified ranges of the standardized chocolates.

Examples of nonstandardized chocolates result when the cocoa butter or milk fat are replaced partially or completely; or when the nutritive carbohydrate sweetener is replaced partially or completely; or flavors imitating milk, butter or chocolate are added or other additions or deletions in formula are made outside the USFDA standards of identify of chocolate or combinations of any of the above.

As a confection, chocolate can take the form of solid pieces of chocolate, such as bars or novelty shapes, and can also be incorporated as a component of other, more complex confections where chocolate is combined with and generally coats other foods such as caramel, nougat, fruit pieces, nuts, wafers, or the like. These foods are characterized as microbiologically shelf-stable at 65°–85° F. under normal atmospheric conditions. Other complex confections result from surrounding soft inclusions such as cordial cherries or peanut butter with chocolate. Other complex confections result from coating ice cream or other frozen or refrigerated deserts with chocolate.

These chocolate products are prepared in accordance with conventional techniques, except the fat matrixes, such as chocolate liquor, containing the amino acid/sugar mixture of the present invention is substituted for the chocolate liquor normally utilized The process of making chocolate is reviewed generally in B. L. Zoumas and E. J. Finnegan, "Chocolate and Cocoa", Kirk-Othmer Encyclopedia of Chemical Technology, Vol. 6 (3rd Ed., Wiley-Interscience, New York) 1–19 (1985) the contents of which are incorporated by reference. Processes for producing chocolate can be either "wet" or "dry". In the "wet" process, chocolate liquor is codried with sweetened condensed milk to generate a crumb that is microbiologically stable. In the "dry" process, milk powder is utilized rather than condensed milk. As such, the ingredients as received are microbiologically stable.

The "dry" process of making chocolate consists essentially of the steps of mixing, refining, conching or liquefying, standardizing and tempering to generate the desired rheology as needed for embodying, molding or producing novelty shapes.

In the first step in the preparation of milk chocolate, chocolate liquor is mixed with a nutritive carbohydrate sweetener, such as extra fine grade granulated sucrose, cocoa butter, and spray dried whole milk powder. The resulting mixture is a paste. Next, in the refining step, essentially a fine grinding operation, the coarse paste from the mixer is passed between steel rollers and converted to a refined flake. Refining breaks up crystalline sugar, fibrous cocoa matter and milk solids such that the sizes of the particles are significantly reduced. This particle size reduction results in the desired smoothness of the chocolate. This is usually accomplished by passing the mixture through a plurality of refining rolls.

In the conching step, the mixture is then stirred while heating to give the final desired consistency to the milk chocolate. This is a mixing-kneading process which allows moisture and volatile components to escape while smoothing the chocolate paste and is critical to the flavor and texture development of the chocolate. Flavor, emulsifiers or cocoa butter are often added during conching.

Alternatively to the conching step, the liquefying step mixes refined flake under high shear over a short period of time. The refined flake is quickly converted to a suspension of solids in a continuous fat phase. The lack of flavor development can be corrected by pretreating the liquor and cocoa butter.

Additional fat and emulsifier are then added in the standardizing or finishing step to adjust viscosity to final specifications.

The final step in obtaining the desired rheology of the chocolate is tempering, a process of inducing satisfactory crystal nucleation of the liquid fat in the chocolate. If the chocolate is improperly cooled, the resulting chocolate will have a grainy texture as well as poor color and appearance.

The tempered chocolate can then be molded or used in enrobing.

In the processes, described hereinabove, instead of using the conventional chocolate liquor, the fat matrix, such as chocolate liquor, containing the amino acid/sugar mixture of the present invention can be substituted therefor. The resulting chocolate product utilizing this roasted chocolate liquor produced in the present invention has acceptable sweet chocolate flavor and has a more enhanced and sweeter flavor than that of chocolate using non-treated chocolate liquor from inferior beans.

The above describes a process for preparing milk chocolate using the fat matrix, e.g., roasted chocolate liquor of the present invention. Other types of chocolate, such as sweet chocolate, buttermilk chocolate, and the like are also prepared utilizing the roasted fat matrix, e.g., roasted chocolate liquor of the present invention. It is mixed with the appropriate ingredients and then following the steps described hereinabove, i.e., refining, conching and liquefying, standardizing and tempering, in accordance with conventional techniques, the chocolate product is prepared.

Nonconventional chocolate confectionery products can also be prepared in accordance with the conventional process utilizing the roasted fat matrix, e.g., roasted chocolate liquor of the present invention, except sugar substitutes, such as bulking agents, sugar alcohols, high potency sweeteners may additionally be used in conjunction with the sucrose in the chocolate making process. Examples of such sugar substitutes include aspartame, cyclamate, saccharin, acesulfame, stevia sweetener, neohesperidin, dihydrochakone, sucralose, alitame, glycyrrhizin, thaumatol, sorbitol, mannitol, xylitol, maltitol, isomalt, lactitol, polydextrose, cellulose, maltodextrin, gum arabic, and the like.

Likewise, the amino acid/sugar mixtures in accordance with the present invention were also found to generate similar cacao flavor when roasted in cocoa butter and the cocoa butter equivalents CHOCLIN™ and COBERINE®.

Instead of cocoa butter, lower calorie fats such as CAPRENIN® may form all or part of the fat matrix and may be mixed with the amino acid/sugar mixture of the present invention to produce a cocoa-flavor enhanced chocolate. These products may be prepared by two different methods. Normally, to produce a CAPRENIN® low-calorie liquor, cocoa butter is removed from the initial liquor by roasting and pressing to obtain a powder which is then combined with CAPRENIN® to produce the low calorie liquor. This procedure was modified by adding the amino acid/sugar mix to the unroasted initial liquor prior to roasting and pressing to obtain a more favorable powder which was then combined with CAPRENIN® to produce a higher flavor low calorie liquor. The procedure was alternatively modified by first roasting the CAPRENIN® with the amino acid/sugar mix to produce a CAPRENIN® component having cocoa flavor which was then added to the powder made from the liquor to produce a higher flavor low calorie liquor.

In addition to the above, it was also found that the addition of the amino acid/sugar mix improved the cacao flavor and overall acceptability of extracted liquor as well.

It was further found that chocolate products prepared utilizing the roasted fat matrix, e.g., chocolate liquor, of the present invention, were significantly higher in chocolate, bitter, nutty and dutch flavor and also in quality compared to the same chocolate products prepared without the treated liquor.

The sugar/amino acid mixture described hereinabove is not limited to sweetening and enhancing the cocoa flavor of chocolate liquors and cocoa beans. It can also be utilized to impregnate other bean products, such as coffee beans, vanilla beans, and the like. Utilizing the nib infusion roasting technique described hereinabove, the amino acid/sugar mixture is added to solvent, such as water, containing the bean product, such as coffee beans. The coffee beans are immersed in the aqueous solvent (e.g., soaked), dried and roasted, in accordance with the procedure described above for the nib infusing roasting technique. Alternatively, if a liquid is formed at any stage of the processing, such as in the manufacturing of instant coffee, the amino acid/sugar mixture is added to the liquid and it is then heated. The heat treatment with the bean intact or in the liquid stage is performed at a temperature and time sufficient to effectuate the reactions between the amino acids and sugar to produce cocoa flavored bean products, such as cocoa flavored coffee or vanilla beans, and the like. In these procedures it is preferred that the amino acid/sugar mixture is added to the solvent in the amounts described herein.

The following examples are provided to further illustrate the present invention.

EXAMPLE 1

Two mixtures of amino acids were formulated based on the free amino acid content of the hot water/cocoa bean extract and the free amino acid content of a fraction of this extract which was adsorbed on a fractionation resin and eluted with a 50% ethanol solution. The specific amino acid mixtures obtained were as follows:

| Amino Acid | Resin Adsorbed Fraction | Whole Extract |
|---|---|---|
| aspartic acid | — | 4.0 mg |
| glutamic acid | — | 4.4 mg |
| serine | — | 1.9 mg |
| histidine | — | 1.9 mg |
| glycine | — | 1.5 mg |
| threonine | — | 1.9 mg |
| arginine | .37 mg | 3.3 mg |
| alanine | .9 mg | 4.4 mg |
| tyrosine | 1.8 mg | 3.4 mg |
| valine | 5.9 mg | 3.3 mg |
| phenylalanine | 24.4 mg | 5.6 mg |
| isoleucine | 2.1 mg | 2.0 mg |
| leucine | 5.0 mg | 7.0 mg |
| lysine | 4.25 mg | 3.0 mg |

Each mixture was mixed with 1.5 g extracted liquor, 20 mg fructose, 5 mg arabinose, 5 mg glucose and 50 µl. water, and roasted for a period of 30 minutes at a temperature of 150° C. The amino acid mixture obtained from the resin fraction resulted in a greater cacao-like aroma than did the amino acid mixture obtained from the whole extract. In addition, the whole extract amino acid mixture resulted in the aroma having a strong burnt character as well.

EXAMPLE 2

An amino acid mixture was prepared, based on the free amino acid content of the material which adsorbs to the fractionation resin as determined in Example 1, as follows:

| Amino Acid | Mg |
|---|---|
| arginine | 1 |
| alanine | 1 |
| tyrosine | 2 |
| valine | 6 |
| phenylalanine | 25 |
| isoleucine | 2 |
| leucine | 5 |
| lysine | 5 |

The above amino acid mixture was mixed with either 20 mg of D-fructose, DL-arabinose or D-glucose, a mixture of sugars comprising 10 mg D-fructose, 5 mg D-glucose and 5 mg DL-arabinose, or no sugar at all, and then dispersed at a level of 5% in unroasted cocoa liquor by combining with 50 µl water and 2 g of hot water extracted liquor (i.e. the naturally occurring cacao flavor precursors had been removed), and roasted for 20 minutes at 150° C. in open vials. The amino acid/reducing sugars mixtures underwent Malliard reactions during the liquor roasting period and resulted in the generation of both cacao flavor and aroma.

Six different samples were run and the results are shown in Table I below. The cacao flavor which was generated was assessed by comparison with a sample derived from 300 mg whole extract powder roasted in 1.7 g extracted liquor. The samples were given randomly and unidentified to expert panelists. Panelists were asked to rate each sample's flavor level for cacao, sugar, hammy/smokey, putrid and floral notes. They were also allowed to add any additional notes they wish. Each person's added notes were revealed at the end of each panel to allow others to add them if they wished. Duplicate judgments were obtained, and the data were analyzed via multifactor Analysis of Variance. Flavor scores were rated on a scale of 0–100 and the results are based on an average of five panelists.

TABLE I

Sugar effect on amino acid mixture and production of cacao flavor.

| Flavor Sample | Whole Cacao Sugar | Mixture | Amino Acid Extract | Rating |
|---|---|---|---|---|
| A | — | — | 300 mg | 82 |
| B | DL-arabinose | + | — | 31 |
| C | — | + | — | 14 |
| D | glucose | + | — | 24 |
| E | Mix | — | — | 4 |
| F | — | — | 300 mg | 71 |
| G | Mix | + | — | 35 |
| H | D-fructose | + | — | 37 |

As shown by the results in Table I, a more intense cacao-like flavor was developed when the amino acid mixture was roasted in the presence of one or all of the sugars (see samples B,D,G and H) as opposed to the amino acid mixture which was roasted without the addition of a reducing sugar (see sample C). Further, it appeared that the type of reducing sugar added did not have a large effect on the cacao-like flavor development. However, of the sugars, fructose alone (sample H) or the mixture of sugars (sample G) had better results than the samples which employed arabinose or glucose alone (samples B and D) when mixed with the mixture of eight amino acids.

EXAMPLE 3

An eleven component amino acid/reducing sugar mixture in accordance with the present invention was prepared by grinding together the sugars and amino acids using a mortar and pestle, and this was subsequently thoroughly mixed in extracted liquor. Said samples were identified as Samples I and II respectively. It is to be noted that Sample II is the amino acid/sugar mixture disclosed by K. H. Ney in Gordian 85(5):88–92 (1985), with the modification that the amino acid/sugar mixture is placed in a chocolate liquor extract. Samples of both mixtures and a freeze dried extract control were roasted in extracted liquor for a period of 25 minutes at 150° C. in recti-vials. The samples were evaluated for taste by a four person sensory panel in accordance with the procedure described in Example 2 and the results are given in Table II below.

TABLE II

Cocoa Flavor of Various Amino Acid/Sugar Mixtures

| Amino Acids | | Sugars | | Matrix | Cacao Flavoring Rating (0–100) |
|---|---|---|---|---|---|
| Sample I | | | | | |
| arginine | (3 mg) | fructose | (50 mg) | 9.75 g | 25 |
| alanine | (3 mg) | glucose | (17 mg) | | |
| tyrosine | (6 mg) | arabinose | (17 mg) | | |
| valine | (20 mg) | | | | |
| phenylalanine | (82 mg) | | | | |
| isoleucine | (6 mg) | | | | |
| leucine | (17 mg) | | | | |
| lysine | (17 mg) | | | | |
| Sample II | | | | | |
| phenylalanine | (50 mg) | fructose | (100 mg) | 9.75 g | 15 |
| leucine | (50 mg) | | | | |
| valine | (50 mg) | | | | |
| Freeze Dried extract of Sample I | | | | | |
| | (450 mg) | | | 4.5 g | 35 |

As is shown by the comparison of the results given in Table II, the first sample contained the most cocoa flavor, and was significantly preferred over the second sample, i.e., the sample containing the mixture of Ney.

EXAMPLE 4

Based on an optimization study on the eleven component amino acid/sugar mixture of Example 3, a simpler amino acid/sugar mixture in accordance with the present invention was determined and comprised phenylalanine, leucine, alanine, tyrosine and glucose. In order to determine the optimal amounts of those four amino acids to be used, an experiment was designed where the glucose content was kept constant (except for one sample which had twice the glucose content as the others and one sample which had half the glucose content as the others) and the four amino acids were added at five different levels to two hundred grams of extracted liquor. Thirty liquor samples were produced, roasted, and each was tested twice by seven panelists and evaluated for cacao flavor, total flavor and off flavors in accordance with the procedure described in Example 2. The results are shown in Table III below.

TABLE III

Variations in four amino acid/one sugar mixture of present invention.

| SAMPLE | TOTAL FLAVOR | CACAO FLAVOR | OFF FLAVOR | PHE (mg/ 200 g extracted liquor) | LEU (mg/ 200 g extracted liquor) | TYR (mg/ 200 g extracted liquor) | ALA (mg/ 200 g extracted liquor) | GLUCOSE (mg/ 200 g extracted liquor) |
|---|---|---|---|---|---|---|---|---|
| 1 | 56.4 | 30.4 | 24.3 | 2500 | 1000 | 1000 | 500 | 3000 |
| 2 | 54.3 | 29.6 | 19.3 | 3750 | 500 | 1500 | 750 | 3000 |
| 3 | 44.3 | 26.1 | 6.8 | 3750 | 1500 | 1500 | 250 | 3000 |
| 4 | 31.8 | 8.2 | 13.9 | 2500 | 0 | 1000 | 500 | 3000 |
| 5 | 53.6 | 34.0 | 16.1 | 3750 | 1500 | 500 | 250 | 3000 |
| 6 | 53.9 | 26.4 | 19.7 | 3750 | 500 | 1500 | 250 | 3000 |
| 7 | 35.0 | 15.4 | 15.4 | 0 | 1000 | 1000 | 500 | 3000 |
| 8 | 54.0 | 36.1 | 11.4 | 1250 | 1500 | 500 | 250 | 3000 |
| 9 | 34.3 | 13.6 | 10.7 | 1250 | 1500 | 1500 | 750 | 3000 |
| 10 | 41.4 | 18.6 | 15.0 | 1250 | 500 | 1500 | 750 | 3000 |

TABLE III-continued

Variations in four amino acid/one sugar mixture of present invention.

| SAMPLE | TOTAL FLAVOR | CACAO FLAVOR | OFF FLAVOR | PHE (mg/ 200 g extracted liquor) | LEU (mg/ 200 g extracted liquor) | TYR (mg/ 200 g extracted liquor) | ALA (mg/ 200 g extracted liquor) | GLUCOSE (mg/ 200 g extracted liquor) |
|---|---|---|---|---|---|---|---|---|
| 11 | 58.9 | 33.2 | 14.7 | 1250 | 1500 | 500 | 750 | 3000 |
| 12 | 60.0 | 33.6 | 21.4 | 2500 | 1000 | 2000 | 500 | 3000 |
| 13 | 47.9 | 25.4 | 16.5 | 3750 | 1500 | 500 | 750 | 3000 |
| 14 | 42.2 | 21.8 | 10.8 | 2500 | 1000 | 1000 | 500 | 3000 |
| 15 | 56.1 | 31.1 | 21.4 | 2500 | 1000 | 0 | 500 | 3000 |
| 16 | 60.0 | 31.4 | 25.0 | 5000 | 1000 | 1000 | 500 | 3000 |
| 17 | 44.2 | 22.9 | 11.1 | 2500 | 1000 | 1000 | 1000 | 3000 |
| 16 | 41.8 | 19.3 | 13.5 | 1250 | 1500 | 1500 | 250 | 3000 |
| 19 | 39.3 | 17.9 | 9.7 | 1250 | 500 | 500 | 250 | 3000 |
| 20 | 40.0 | 11.8 | 17.5 | 1250 | 500 | 500 | 750 | 3000 |
| 21 | 58.6 | 35.3 | 16.5 | 3750 | 1500 | 8250 | 750 | 3000 |
| 22 | 51.8 | 34.0 | 13.9 | 1250 | 500 | 1500 | 250 | 3000 |
| 23 | 45.4 | 21.1 | 12.9 | 3750 | 500 | 500 | 250 | 3000 |
| 24 | 54.6 | 27.8 | 15.7 | 3750 | 500 | 500 | 750 | 3000 |
| 25 | 49.3 | 24.3 | 15.7 | 2500 | 2000 | 1000 | 500 | 3000 |
| 26 | 49.2 | 29.6 | 11.4 | 2500 | 1000 | 1000 | 0 | 3000 |
| 27 | 60.4 | 30.7 | 19.3 | 2500 | 1000 | 1000 | 500 | 3000 |
| 28 | 21.08 | 0.9 | 13.0 | 0 | 0 | 0 | 0 | 3000 |
| 29 | 44.7 | 22.9 | 10.4 | 2500 | 1000 | 1000 | 500 | 1500 |
| 30 | 40.4 | 18.9 | 13.9 | 2500 | 1000 | 1000 | 500 | 6000 |

As can be seen by the results given in Table III, all of the samples provided flavor. However, a more intense cacao flavor was positively correlated with higher levels of leucine and phenylalanine and negatively correlated with higher levels of tyrosine. Consequently, the best cacao flavor was obtained when phenylalanine was at its highest level, leucine was at its highest level and tyrosine was at its lowest level (see, for example, samples 5 and 13 of Table III). A significant interaction was also detected between alanine and phenylalanine in that the better cacao flavor was obtained when both of these amino acids were at high levels. Good flavor was also found to be generated when phenylalanine was high and alanine was low or when both phenylalanine and alanine were low. However, where alanine was present at high levels and phenylalanine was present at low levels, said combination produced less flavor (see sample nos. 9–11 and 20 of Table III).

Based on the analysis of the results shown in Table III together with the results shown in Table II, it was determined that phenylalanine, leucine and especially phenylalanine, leucine and alanine were major contributors to the cacao flavor produced when the amino acid/sugar mix was roasted in extracted liquor. Optimum effects were found where said mix comprised 2000 mg leucine/200 g liquor, 3750 mg phenylalanine/200 g liquor, 750 mg alanine/200 g liquor and 3000 mg glucose/200 g liquor. Tyrosine was not included in this optimum mix.

EXAMPLE 5

Three amino acid/sugar mixtures were prepared with the following compositions:

| Ingredient | Mixture 1* | Mixture 2* | Mixture 3* |
|---|---|---|---|
| leucine | 1000 | 370 | 1000 |
| phenylalanine | 1875 | 1800 | 1875 |
| alanine | 375 | 70 | 375 |

-continued

| Ingredient | Mixture 1* | Mixture 2* | Mixture 3* |
|---|---|---|---|
| arginine |  | 70 | 70 |
| isoleucine |  | 70 | 70 |
| lysine |  | 370 | 370 |
| tyrosine |  | 130 | 0 |
| valine |  | 430 | 430 |
| arabinose |  | 412 | 412 |
| fructose |  | 825 | 825 |
| glucose | 1500 | 412 | 412 |

*(all amounts given in mg/100 g liquor)

Mixture 1 represented the optimum mixture, Mixture 2 represented an eleven component mix and Mixture 3 represented the original eleven component mix but with the optimum levels of the leucine, phenylalanine and alanine as used in Mixture 1. In addition, it is noted that tyrosine was omitted from Mixture 3.

The amino acid/sugar mixtures were refined into extracted liquor and the liquor was roasted for a period of 6.5 minutes at a temperature of 165° C. The liquors were tasted twice by a panel of seven and rated for total flavor, cacao flavor and off-flavors in accordance with the procedure described in Example 2. The results are given in Table IV.

TABLE IV

Comparison of optimum mixed original eleven component mix.

| Mixture | Total Flavor | Cacao Flavor | Off Flavor |
|---|---|---|---|
| 1 | 54.3 | 27.9 | 20.7 |
| 2 | 55 | 33.2 | 16.9 |
| 3 | 58.6 | 35.0 | 21.1 |

As shown by the results given in Table IV, Mixture 3 had the highest cacao scores although the differences from the other mixtures were not significant. Consequently, it was found that leucine, phenylalanine and alanine and especially phenylalanine and leucine, were the major contributors to cacao flavor, and that while the other components may have added some additional good flavors, their contribution was relatively minor in comparison.

EXAMPLE 6

Once it was determined that the eleven component mix of Example 3 was successful in generating cacao flavor when roasted in extracted liquor, the capabilities of the amino acid/sugar mixture was then tested in other mixtures and compared to the results obtained with the extracted liquor.

The amino acid/sugar mix prepared in accordance with Example 5 was roasted in the following matrices and produced the indicated flavors:

| Roasting Matrix | Flavor |
| --- | --- |
| A) CHOCLIN ™ (6 g) + cellulose (4 g) | bitter, metallic carbo, chemical, cacao |
| B) COBERINE ® (6 g) + cellulose (4 g) | bitter, metallic, cacao |
| C) CRISCO ® (6 g) + cellulose (4 g) | bitter, grain, starch |
| D) cocoa butter (6 g) + cellulose (4 g) | bitter, cacao |
| E) extracted liquor (10 g) | floral, bitter, cacao, bread |

Of the five matrices, cacao flavor was best generated in the extracted liquor. However, cacao flavor was also significantly generated in the cocoa butter, COBERINE® and CHOCLIN™ matrices with the cocoa butter matrix providing a somewhat greater cocoa flavor than the COBERINE® and CHOCLIN™ matrices, and the COBERINE® matrix generating a somewhat greater cacao flavor than the CHOCLIN™ matrix. Essentially no cacao flavor was generated when the amino acid/sugar mixture was roasted in the CRISCO® shortening, which is a cooking shortening, and not a shortening used in making chocolate confections.

EXAMPLE 7

The amino acid/sugar mixture as set forth in Example 5, Mixture 2, was added to unroasted liquor. The liquor was then refined using the roller refiner. The unroasted liquor, both with and without the addition of amino acid/sugars mixture underwent heating blocked roasting in reacti-vials (3 g/vial) for a period of twenty minutes at a temperature of 150° C. After roasting, the cocoa butter was pressed from the liquor using the carver press. The pressed powder was then mixed with CAPRENIN® at a ratio of 4 g powder/10 g CAPRENIN®. A third sample of pressed powder (plant roasted) was also mixed with CAPRENIN®. The three samples were tasted and rated on a scale of 0 to 100 in terms of cacao flavor, off flavors and over all acceptabilities in accordance with the procedure described in Example 2. The results, averaged from four panelists, are shown in Table V below:

TABLE V

| Sample | Cacao Flavor | Off Flavor | Overall Acceptability |
| --- | --- | --- | --- |
| pressed powder without amino | 38.75 | 4.5 | 42.0 |
| acid/sugar mixture pressed powder with amino acid/sugar mixture | 50.25 | 5.0 | 51.5 |
| plant roasted pressed powder | 44.25 | 3.0 | 51.75 |

From the results of the panelist testing, it was found that the addition of the amino acid/sugars mixture to the liquor prior to roasting and pressing increased the production of cacao flavor in the final powder/CAPRENIN® blend. It was further determined that plant roasting generated greater flavor than roasting the liquor under heating block conditions.

EXAMPLE 8

The amino acid/sugar mixture as set forth in Example 5, Mixture 2 was added to CAPRENIN® and 2% powdered cellulose in a ratio of 1:20. The CAPRENIN®/cellulose/ amino acid/sugar mixture was roasted in reacti-vials (3 g/vial) for either 10, 15 or 22 minutes at 150° C. After roasting, the mixture was mixed with pressed powder (plant roasted) obtained from chocolate liquor. These samples along with a sample of unroasted CAPRENIN® and cellulose and powder were rated for cocoa flavor, off flavors and overall acceptability on a scale of 0 to 100, in accordance with the procedure described in Example 2.

| Sample | Cacao Flavor | Off Flavor | Overall Acceptability |
| --- | --- | --- | --- |
| pressed powder & CAPRENIN ® without amino acid/ sugar mixture | 16.5 | 1.0 | 21.5 |
| pressed powder & CAPRENIN ® with amino acid/sugar mixture - 10 min. roast | 46.0 | 23.0 | 46.0 |
| pressed powder & CAPRENIN ® with amino acid/sugar mixture - 15 min. roast | 43.5 | 23.5 | 48.5 |
| pressed powder & CAPRENIN ® with amino acid/sugar mixture - 22 min. roast | 38.5 | 32.0 | 27.5 |

From the results of the panelist testing, it was found that cacao flavor and overall acceptability of the low calorie liquor is increased by roasting the amino acid/sugar mix in CAPRENIN® and using this flavorful CAPRENIN® to formulate the liquor as opposed to using unadulterated CAPRENIN® in the mix. It was further determined that flavor in the roasted amino acid/sugar/CAPRENIN® mix is sensitive to roasting conditions; over roasting leads to the generation of off flavors and lower acceptability.

EXAMPLE 9

In order to determine the flavor effect of the addition of the amino acid/sugar mix in accordance with the present invention to non-extracted liquor, an amino acid/sugar mix comprising 1500 mg phenylalanine, 375 mg leucine, 750 mg tyrosine, 250 mg alanine and 750 mg glucose was refined into two different raw liquors. These liquors were previously shown to have low cacao flavor potential. These liquors and the amino acid/sugar mixture, along with control samples of the liquors without additions, were flake roasted for a period of about 5.75 to about 6 minutes. The samples were roasted and rated for cacao flavor, off flavor and overall acceptability in accordance with the procedure described in Example 2 and the results are given in Table VI.

TABLE VI

| | Amino acid/sugar mixture with non-extracted liquors. | | |
|---|---|---|---|
| | Cacao Flavor | Off Flavors | Overall Acceptability |
| Liquor A | 18 | 16 | 26 |
| Liquor A & amino acid/ sugar mixture | 28 | 26 | 36 |
| Liquor B | 18 | 34 | 16 |
| Liquor B & amino acid/ sugar mixture | 32 | 10 | 50 |

As can be already seen from the results of the tests, the addition of the amino acid/sugar mix of the present invention markedly improves the cacao flavor and overall acceptability of non-extracted liquors.

EXAMPLE 10

The following samples were obtained:
1. Liquor B Control: Liquor B cocoa nibs roasted as liquor for 20 minutes at 120° C.
2. Liquor B Variant: 5 g leucine, 9.37 g of phenylalanine 1.87 g alanine and 7.5 g glucose were added to 500 g of unroasted Liquor B and roasted in a liquor roaster for 20 minutes at 120° C.
3. Liquor A Control: Liquor A cocoa nibs were roasted as liquor in a liquor roaster for 20 minutes at 120° C.
4. Liquor A Variant: 5 g leucine, 9.37 g phenylalanine, 1.8 g alanine and 7.5 g glucose were added to 500 g of unroasted Liquor A and roasted for 20 minutes at 120° C.

Each of the samples were submitted to the taste panelist in accordance with the procedure described in Example 2.

The panel concluded that there were no statistically reliable differences in cacao flavor between Liquor A and Liquor B without precursors added. However, samples with the precursors added were significantly higher in cacao flavor than those without.

EXAMPLE 11

The Liquor A liquor roasted both with and without the amino acid/sugar mix of Example 10 was used to make dark chocolate and mixed as follows:

| | AMOUNT BY WEIGHT | AMOUNT BY WEIGHT |
|---|---|---|
| Liquor A liquor | 38% | — |
| Sugar(Sucrose) | 50% | 50% |
| added cocoa butter | 12% | 12% |
| Lecithin | 0.02% | 0.02% |
| Liquor A liquor + amino acid/sugar mixture | — | 38% |

Each sample was conched, and refined into dark chocolate, and molded into dark chocolate bars. The bars were submitted to a trained sensory panel for evaluation, in accordance with the procedure of Example 2.

The panel concluded that dark chocolate made with precursor treated liquor (amino acid/sugar mixture) was significantly higher in chocolate, bitter, nutty and dutch flavors and also in quality compared to chocolate made with untreated liquor.

EXAMPLE 12

The Liquor A liquor roasted both with and without the amino acid/sugar mixture of Example 10 was used to make milk chocolate as follows:

| | PERCENT BY WEIGHT | PERCENT BY WEIGHT |
|---|---|---|
| Liquor A liquor | 13% | — |
| Milk solids | 18% | 18% |
| Sugar | 48% | 48% |
| Lecithin | 0.02% | 0.02% |
| added cocoa butter | 21% | 21% |
| Liquor A liquor + amino acid/sugar mix | — | 13% |

Each sample was conched and refined into milk chocolate and molded into milk chocolate bars. The bars were submitted to a trained sensory panel for evaluation, in accordance with the procedure of Example 2.

The panel concluded that the milk chocolate made with precursor treated liquor (amino acid/sugar mixture) was significantly higher in chocolate and perfumey flavors.

EXAMPLE 13

Three different samples were prepared
(a) control-untreated low flavor (Liquor A) cocoa nibs (500 g) added to water.
(b) Variant 1–1.5 g leucine, 9.3 g of phenylalanine, 1.87 g of alanine and 7.5 g glucose were dissolved in water. 500 g of cocoa nibs were added to the solution.
(c) Variant 2–500 g of low flavor (Liquor A) cocoa nibs and 45% of the amino acid/sugar mixture added to variant 1, i.e., 2.3 g of leucine, 4.2 g of phenylalanine, 0.8 g of alanine and 3.4 g of glucose dissolved in water.

In each sample, the nibs were allowed to soak in the water at 50° C. for one hours. The water content of the nib, at the end of the soaking step is about 30% (w/w). The nibs were separated from the solution and dried in an oven at 50° C. to lower the moisture content to 5%. The nibs were roasted for two minutes at 165° C.

The nibs were then ground and refined to form liquor.

Each of the samples of the nib roasted liquors were evaluated for taste randomly and unidentified. Panelists were asked to rate each sample's flavor level for cacao flavor, sour flavor, putrid flavor, bitter flavor, nutty flavor, cheesy flavor and overall quality.

The control had greater cheesy flavor, nutty flavor, sour flavor and putrid flavor than either variant 1 or variant 2. The cacao flavor and overall quality of variant 1 and variant 2 were about the same and were directionally better than that of the control.

The above preferred embodiments and examples are given to illustrate the scope and spirit of the present invention. The embodiments and examples described herein will make apparent, to those skilled in the art, other embodiments and examples. These other embodiments and examples are within the contemplation of the present invention. Therefore, the present invention should be limited only by the appended claims.

What is claimed is:

1. A process for enhancing cocoa flavor in a fat matrix comprising:
   (a) mixing a reducing sugar with a first and second amino acid in a fat matrix, said first amino acid being phenylalanine and said second amino acid being leucine, with each amino acid and each reducing sugar being present in the following amounts per 100 g of said fat matrix:
      (i) about 0.3 g to about 4.0 g phenylalanine;
      (ii) about 0.3 g to about 2.0 g leucine;
      (iii) about 0.5 g to about 3.0 g reducing sugar, the weight of phenylalanine being present is at least 1.25 times the weight of leucine present, and
   (b) roasting the mixture under conditions sufficient to effect flavor producing reactions between the amino acids and the reducing sugar.

2. The process according to claim 1 wherein the ratio of the total weight of amino acids to the total weight of the reducing sugar ranges from about 0.2:1 to about 3:1.

3. The process of claim 1 where the ratio of phenylalanine to leucine ranges from about 1.5 to about 6.0 (w/w).

4. The process of claim 1 where the amino acids are in the L-configuration.

5. The process of claim 1 wherein the reducing sugar is in the D configuration or is a racemic mixture.

6. The process of claim 1 wherein the reducing sugar is glucose, fructose, arabinose or mixtures thereof.

7. The process according to claim 1 wherein the fat matrix is chocolate liquor.

8. The process of claim 1 in which the fat matrix is cocoa butter, a cocoa butter equivalent, a cocoa butter substitute or a combination thereof.

9. The process of claim 8 wherein the fat matrix is cocoa butter, caprocaprylobehenin, vegetable oil from palm and shea, or a product produced by the interesterification of highly hydrogenated vegetable oil with a triacylglycerol of acetic acid, propionic acid, butyric acid or a combination thereof.

10. The process according to claim 1 wherein the fat matrix is cocoa butter admixed with a second fat which is a cocoa butter equivalent or cocoa butter substitute.

11. The process according to claim 10 wherein the second fat is caprocaprylobehenin, vegetable oil from palm and shea, or a product produced by the interesterification of highly hydrogenated vegetable oil with a triacylglycerol of acetic acid, propionic acid, butyric acid or a combination thereof.

12. The process according to claim 1 wherein a third amino acid is added to the unroasted fat matrix, wherein the third amino acid is alanine.

13. The process according to claim 10 wherein alanine is present in amounts ranging from about 0.05 g to about 0.8 g for each 100 g of unroasted fat matrix.

14. The process according to claim 1 wherein alanine is added and wherein at least one additional amino acid is selected from the group consisting of tyrosine, arginine, valine, isoleucine and lysine are added to the unroasted fat matrix.

15. The process according to claim 14 wherein for each 100 g of fat matrix is added about 0.05 g to about 0.8 g alanine, up to about 1.5 g of tyrosine, up to about 0.4 g arginine, up to about 0.7 g of valine, up to about 0.3 g isoleucine, and up to about 0.75 g lysine.

16. A process for enhancing cocoa flavor in a fat matrix comprising:
   (a) mixing a reducing sugar with first, second and third amino acids in a fat matrix, said first amino acid being phenylalanine, said second amino acid being leucine and said third amino acid being alanine, with each amino acid and each reducing sugar being present in the following amounts per 100 g of said fat matrix;
      (i) about 0.3 g to about 4.0 g phenylalanine;
      (ii) about 0.3 g to about 2.0 g leucine;
      (iii) about 0.05 to about 0.8 g alanine and
      (iv) about 0.5 g to about 3.0 g reducing sugar and
   (b) roasting the mixture under conditions sufficient to effect flavor producing reactions between the amino acids and the reducing sugars.

17. The process of claim 16 wherein the ratio of the total weight of amino acids to the total weight of reducing sugar ranges from about 0.2:1 to about 3:1.

18. The process of claim 16 wherein the amino acids are in the L-configuration.

19. The process of claim 16 wherein the reducing sugars in the D configuration or in a racemic mixture.

20. The process of claim 16 wherein the reducing sugar is glucose, fructose, arabinose or mixtures thereof.

21. The process according to claim 16 wherein the fat matrix is chocolate liquor or nibs from cocoa beans.

22. The process according to claim 16 wherein the fat matrix is cocoa butter, cocoa butter equivalent, a cocoa butter substitute or a combination thereof.

23. The process of claim 22 wherein the fat matrix is cocoa butter, caprocaprylobehenin, vegetable oil from palm and shea, or a product produced by the interesterification of highly hydrogenated vegetable oil with a triacylglycerol of acetic acid, propionic acid, butyric acid or a combination thereof.

24. The process according to claim 16 wherein the fat matrix is cocoa butter admixed with a second fat comprising a cocoa butter equivalent or cocoa butter substitute.

25. The process according to claim 24 wherein the second fat is caprocaprylobehenin, vegetable oil from palm and shea, or a product produced by the interesterification of highly hydrogenated vegetable oil with a triacylglycerol of acetic acid, propionic acid, butyric acid or a combination thereof.

26. The process according to claim 16 wherein additional amino acids are added in step (a).

27. The process according to claim 26 wherein at least one of the amino acids selected from the group consisting of tyrosine, arginine, valine, isoleucine and lysine is added to the unroasted fat matrix.

28. A process for enhancing cocoa flavor in chocolate liquor derived from inferior cocoa beans comprising (a) mixing amino acids with a reducing sugar in chocolate liquor, said amino acids comprising phenylalanine, leucine and alanine, with each amino acid and each reducing sugar being present in the following amounts per each 100 g of chocolate liquor: about 0.3 g to about 4.0 g phenylalanine, about 0.3 g to about 2.0 g leucine, and 0.05 g to about 0.8 g of alanine and about 0.5 g to about 3.0 g reducing sugar and (b) roasting the mixture of (a) under sufficient conditions to effect flavor producing reactions between the amino acids and the reducing sugar.

29. The process of claim 28 wherein the ratio of the total weight of amino acids to the total weight of the reducing sugar ranges from about 0.2:1 to about 3:1.

30. The process of claim 28 wherein the ratio of phenylalanine to leucine ranges from about 1.5 to about 6 (w/w).

31. The process of claim 28 wherein the amino acids are in the L-configuration.

32. The process of claim 28 wherein the reducing sugar is in the D-configuration or is a racemic mixture.

33. The process according to claim 28 wherein the reducing sugar is glucose, fructose or arabinose or mixtures thereof.

34. The process according to claim 28 wherein the amount of phenylalanine present ranges from about 1.0 g to about 2.0 g per 100 g of unroasted chocolate liquor.

35. The process according to claim 28 wherein the alanine is present in amounts ranging from about 0.1 g to about 0.5 g per 100 g of unroasted chocolate liquor.

36. The process according to claim 28 wherein the amount of leucine present ranges from about 0.5 to about 1.25 g per 100 gms of unroasted chocolate liquor.

37. The process according to claim 28 wherein the amount of reducing sugar present ranges from about 0.75 to about 1.5 g per 100 g of unroasted chocolate liquor.

38. The process according to claim 28 wherein at least one additional amino acid selected from the group consisting of tyrosine, arginine, valine, isoleucine and lysine is additionally added to the unroasted chocolate liquor.

39. The process according to claim 38 wherein up to about 1.5 g tyrosine, up to about 0.4 g arginine, up to about 0.7 g valine, up to about 0.3 g isoleucine, or up to about 0.75 g lysine is additionally added for each 100 g of unroasted chocolate liquor.

40. A process for enhancing the cocoa flavor of cocoa nibs from inferior cocoa beans comprising:
(a) soaking said cocoa nibs with an amino acid/sugar mixture in water under conditions effective for the amino acid/sugar mixture to be absorbed by the cocoa nibs, said amino acid/sugar mixture comprising an amino acid component and a reducing sugar, said amino acid component being a mixture of phenylalanine and leucine with said amino acid component and said reducing sugar being present in amounts relative to that quantity of cocoa nibs that would generate, when ground and refined, 100 g of unroasted liquor, as follows: about 0.3 g to about 4.0 g phenylalanine, about 0.3 g to about 2.0 g leucine, and 0.5 g to about 3.0 g of reducing sugar, the weight of phenylalanine present is at least 1.25 times the weight of leucine present; and
(b) roasting the cocoa nibs under conditions effective to promote flavor-producing reactions.

41. The process according to claim 40 wherein alanine is additionally present.

42. A process for enhancing the cocoa flavor of cocoa nibs from inferior cocoa beans comprising:

(a) soaking said cocoa nibs with an amino acid/sugar mixture in aqueous solvent under conditions effective for the amino acid/sugar mixture to be absorbed by the cocoa nibs, said amino acid/sugar mixture comprising an amino acid component and a reducing sugar, said amino acid component being a mixture of phenylalanine, leucine and alanine and said amino acids component and said reducing sugar being present in amounts relative to that quantity of cocoa nibs that would generate, when ground and refined, 100 g of unroasted liquor, as follows:
about 0.3 g to about 4.0 g phenylalanine, about 0.3 g to about 2.0 g leucine, 0.5 g to about 3.0 g of reducing sugar and about 0.05 g to about 0.8 g alanine; and
(b) roasting the cocoa nibs under conditions effective to promote flavor-producing reactions.

43. The process according to claim 40 or 42 wherein the cocoa nibs are separated from the excess solvent prior to roasting.

44. The process according to claim 40 or 42 wherein the cocoa nibs are separated from the excess and dried under conditions to effectively reduce the moisture content thereof.

45. The process of claim 40 or 42 which additionally comprises grinding and refining the roasted cocoa nibs.

46. The process of claim 40 or 42 wherein the ratio of the total weight of amino acids to the total weight of the reducing sugar ranges from about 0.2:1 to about 3:1.

47. The process of claim 40 or 42 wherein the ratio of phenylalanine to leucine ranges from about 1.5 to about 6 (w/w).

48. The process of claim 40 or 42 wherein the amino acids are in the L configuration.

49. The process according to claim 40 or 42 wherein the reducing sugar is glucose, fructose or arabinose.

50. The process according to claim 40 or 42 wherein the phenylalanine is present in amounts ranging from about 1.0 g to about 2.0 g.

51. The process according to claim 40 or 42 wherein the amount of leucine ranges from about 0.5 to about 1.25 g.

52. The process according to claim 40 or 42 wherein the amount of reducing sugar present ranges from about 0.75 g to about 1.5 g.

53. The process according to claim 40 or 42 wherein at least one additional amino acid selected from the group consisting of tyrosine, arginine, valine, isoleucine, and lysine is additionally added to the amino acid/sugar mixture.

54. The process according to claim 42 wherein the amount of alanine present ranges from about 0.1 g to about 0.5 g.

55. The process according to claim 40 or 42 wherein the reducing sugar is in the D configuration or in racemic mixtures.

56. The process according to claim 40 or 42 wherein the reducing sugar is D glucose, D fructose, D arabinose, D, L-arabinose or a combination thereof.

\* \* \* \* \*